United States Patent
Krishnamurthy et al.

(10) Patent No.: US 8,423,799 B2
(45) Date of Patent: Apr. 16, 2013

(54) MANAGING ACCELERATORS OF A COMPUTING ENVIRONMENT

(75) Inventors: Rajaram B. Krishnamurthy, Wappingers Falls, NY (US); Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 12/627,050

(22) Filed: Nov. 30, 2009

(65) Prior Publication Data

US 2011/0131430 A1 Jun. 2, 2011

(51) Int. Cl.
- *G06F 1/00* (2006.01)
- *G06F 1/26* (2006.01)
- *G06F 1/32* (2006.01)
- *G06F 9/46* (2006.01)

(52) U.S. Cl.
USPC ........... 713/300; 713/320; 718/100; 718/102; 718/103; 718/104; 718/105

(58) Field of Classification Search ................... 713/300, 713/320; 718/100, 102, 103, 104, 105
See application file for complete search history.

(56) References Cited

U.S. PATENT DOCUMENTS

| | | | |
|---|---|---|---|
| 6,347,328 B1 * | 2/2002 | Harper et al. ................. | 718/105 |
| 6,795,928 B2 * | 9/2004 | Bradley et al. ................ | 713/320 |
| 7,024,671 B2 | 4/2006 | Yamashita | |
| 7,058,826 B2 * | 6/2006 | Fung ............................. | 713/300 |
| 7,174,469 B2 | 2/2007 | Luick | |
| 7,536,461 B2 * | 5/2009 | Stecher et al. ................ | 709/226 |
| 7,694,160 B2 * | 4/2010 | Esliger et al. ................ | 713/320 |
| 7,739,388 B2 * | 6/2010 | Wood ............................. | 709/226 |
| 7,770,176 B2 * | 8/2010 | Maeda et al. ................ | 718/105 |
| 7,814,485 B2 | 10/2010 | Morgan et al. | |
| 7,844,839 B2 * | 11/2010 | Palmer et al. ................ | 713/300 |
| 8,032,891 B2 * | 10/2011 | Chauvel et al. .............. | 718/105 |
| 2002/0124196 A1 | 9/2002 | Morrow et al. | |
| 2003/0158884 A1 * | 8/2003 | Alford, Jr. .................... | 709/104 |
| 2003/0217090 A1 | 11/2003 | Chauvel et al. | |
| 2004/0123297 A1 * | 6/2004 | Flautner et al. .............. | 718/102 |
| 2005/0149927 A1 * | 7/2005 | Abe ............................... | 718/100 |
| 2007/0016643 A1 * | 1/2007 | Boss et al. .................... | 709/206 |
| 2007/0079150 A1 | 4/2007 | Belmont et al. | |
| 2007/0094525 A1 | 4/2007 | Uguen et al. | |
| 2007/0143159 A1 * | 6/2007 | Dillard et al. ................ | 705/7 |
| 2007/0157207 A1 * | 7/2007 | Kim et al. .................... | 718/103 |
| 2007/0220294 A1 | 9/2007 | Lippett | |

(Continued)

OTHER PUBLICATIONS

Nutt Gary, Operating Systems: A Modern Perspective, 2000, Addison-Wesley, 2$^{nd}$ Ed., p. 176.*

(Continued)

*Primary Examiner* — Mark Connolly
(74) *Attorney, Agent, or Firm* — Steven Chiu, Esq.; Blanche E. Schiller, Esq.; Heslin Rothenberg Farley & Mesiti P.C.

(57) ABSTRACT

Accelerators of a computing environment are managed in order to optimize energy consumption of the accelerators. To facilitate the management, virtual queues are assigned to the accelerators, and a management technique is used to enqueue specific tasks on the queues for execution by the corresponding accelerators. The management technique considers various factors in determining which tasks to be placed on which virtual queues in order to manage energy consumption of the accelerators.

20 Claims, 9 Drawing Sheets

U.S. PATENT DOCUMENTS

| | | | |
|---|---|---|---|
| 2007/0266385 A1* | 11/2007 | Flautner et al. | 718/102 |
| 2008/0059769 A1 | 3/2008 | Rymarczyk et al. | |
| 2008/0098395 A1 | 4/2008 | Backer | |
| 2008/0209238 A1 | 8/2008 | Dolwin | |
| 2009/0144734 A1* | 6/2009 | Diez et al. | 718/100 |
| 2009/0187775 A1 | 7/2009 | Ishikawa | |
| 2009/0199193 A1* | 8/2009 | Jackson | 718/104 |
| 2009/0254660 A1* | 10/2009 | Hanson et al. | 709/226 |
| 2009/0265568 A1* | 10/2009 | Jackson | 713/320 |
| 2009/0265712 A1* | 10/2009 | Herington | 718/103 |
| 2010/0005474 A1* | 1/2010 | Sprangle et al. | 718/104 |

OTHER PUBLICATIONS z/Architecture Principles of Operation, IBM Publication No. SA22-7832-07, Feb. 2009.

Office Action for U.S. Appl. No. 12/627,055 dated Jun. 18, 2012.

Office Action for U.S. Appl. No. 12/627,055 dated Nov. 16, 2012.

* cited by examiner

MANAGING ACCELERATORS OF A COMPUTING ENVIRONMENT

BACKGROUND

This invention relates, in general, to facilitating processing within a computing environment, and in particular, to managing accelerators of the computing environment.

Accelerators are used today to increase the processing capabilities of a server. In particular, accelerators coupled to the server are optimized to perform certain functions, enabling those functions to be performed at higher speeds than if those functions were performed by the server. When a function is reached in a program executed by the server, the server sends a request to an accelerator to perform the function. The accelerator performs the function and forwards the result back to the server. The server either performs further processing on the returned result or simply forwards the result to another accelerator, which then performs processing on the result and sends the result back to the server, again.

In production systems, typically all accelerators in a cluster of accelerators are powered up at the same time, even those accelerators that are not currently needed. Each accelerator has a plurality of power states associated therewith including, for instance, active, power down, stand-by and hibernate. Eventually, unused accelerators enter standby or hibernate mode. Then, when service for an accelerator in one of these modes is requested, the application is blocked until the accelerator completely wakes up.

BRIEF SUMMARY

The powering up of all accelerators, even those that are not currently used, wastes energy. Further, energy is wasted if one accelerator can perform the work of several accelerators in a timely manner. By managing the use of the accelerators, energy is saved. However, this managing is to be performed such that applications do not miss completion deadlines or other specified criteria. For instance, if an accelerator in a power down mode or in a hibernate state, such as in hibernate or standby mode, is going to be needed, it is awaken ahead of application dispatch in order to avoid having the application wait for the accelerator.

The shortcomings of the prior art are overcome and additional advantages are provided through the provision of a computer program product for managing accelerators of a computing environment. The computer program product comprises a storage medium readable by a processing circuit and storing instructions for execution by the processing circuit for performing a method. The method includes, for instance, analyzing a plurality of tasks on a queue to obtain overall requirements for one or more accelerators of a set of accelerators; and assigning the plurality of tasks to the one or more accelerators based on the analyzing, wherein the assigning facilitates managing energy consumption of the set of accelerators.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a capability is provided for managing accelerators of a computing environment. In particular, the accelerators are managed, such that energy consumption is optimized. In one example, to manage energy consumption of accelerators, queues are employed in a queue management technique, as described in further detail below.

Figure 1:
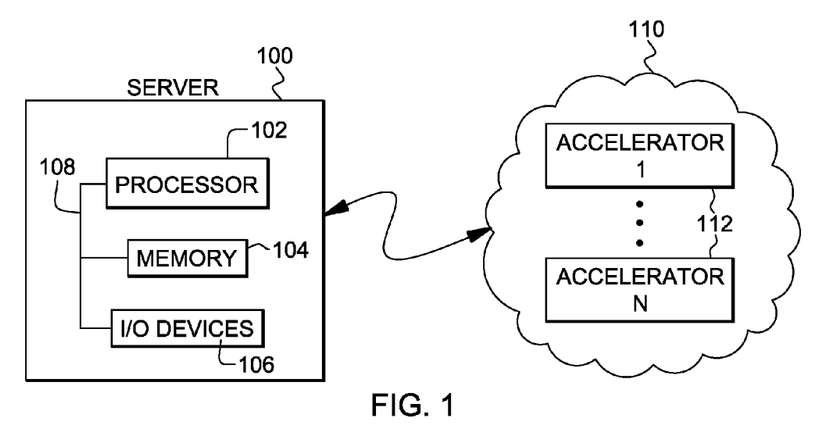
FIG. 1 depicts one embodiment of a computing environment to incorporate and use one or more aspects of the present invention.

One example of a computing environment to incorporate and use one or more aspects of the present invention is depicted in FIG. 1. In this example, a server 100 is coupled to an accelerator cluster (a.k.a., a set of accelerators) 110. Server 100 includes, for instance, one or more processors 102, memory 104, and one or more input/output (I/O) devices 106 coupled to one another via one or more buses 108. As examples, server 102 is a System p®, System x® or System z® server offered by International Business Machines Corporation (IBM®), Armonk, N.Y. IBM®, System p®, System x® and System z® are registered trademarks of International Business Machines Corporation, Armonk, N.Y. Other names used herein may be registered trademarks, trademarks or product names of International Business Machines Corporation or other companies.

In another embodiment, the server includes one or more partitions or zones. For example, the server is a logically partitioned System z® server based on the z/Architecture® offered by International Business Machines Corporation, Armonk, N.Y. The z/Architecture® is described in an IBM® publication entitled, "z/Architecture Principles of Operation," IBM Publication No. SA22-7832-07, February 2009, which is hereby incorporated herein by reference in its entirety. z/Architecture® is a registered trademark of International Business Machines Corporation, Armonk, N.Y.

Server 100 communicates with accelerator cluster 110 via, for instance, a network, such as PCI Express, Infiniband, Ethernet, etc. Accelerator cluster 110 includes, for instance, a plurality of hardware accelerators 112, such as a plurality of blades in a blade center or chassis. Example accelerators include IBM® Cell BE blades; IBM® Datapower units; nVidia GPUs; and/or System p® or System x® blades, offered by International Business Machines Corporation. A cluster of accelerators may include the same type of accelerators or a mix of accelerators. In one example, each accelerator has a switch associated therewith having one port as an input port from the server and one port as an output port to the server. In other examples, other ports may also be used.

Figure 2A:
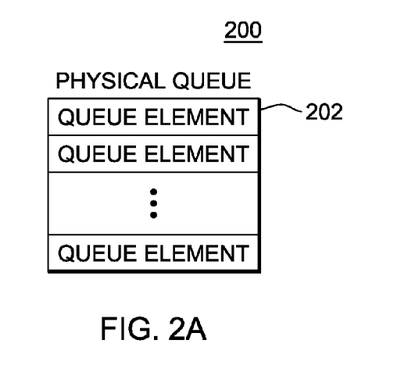
FIG. 2A depicts one example of a physical queue used in accordance with an aspect of the present invention.

In accordance with an aspect of the present invention, there is one physical queue per server, or per logical partition or zone in a partitioned environment. To facilitate description herein, it is said that there is one physical queue per computing unit, in which a computing unit is a server, logical partition or zone, as examples. The queue is employed across the processes (a.k.a., address spaces) of the computing unit. One example of a physical queue is described with reference to FIG. 2A. A physical queue 200 includes a plurality of queue elements 202, and each queue element includes descriptive information, as described with reference to FIG. 2B.

Figure 2B:
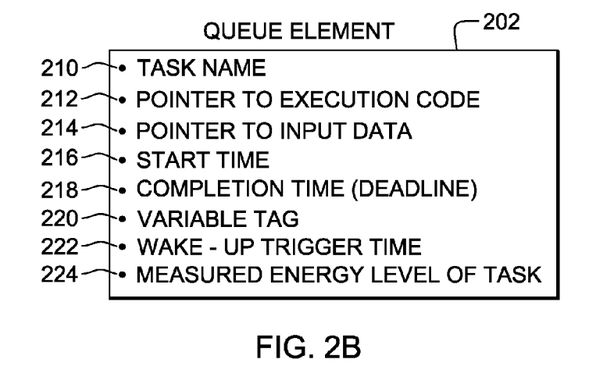
FIG. 2B depicts one example of descriptive data of a queue element of the physical queue of FIG. 2A, in accordance with an aspect of the present invention.

Referring to FIG. 2B, in one example, queue element 202 includes a descriptor having, for instance, a task name 210 identifying a task (e.g., function) to be executed by an accelerator; a pointer to execution code for the task to be performed 212; a pointer to input data 214 for the task; a start time 216 of the task indicating when the task is to be scheduled (zero indicates it should be scheduled as early as possible); a required completion time (i.e., deadline) 218 for the task indicating when the task needs to be complete (zero indicates the task should be completed as early as possible); a variable tag 220 indicating if the task has a variable unknown execution time; a wake-up trigger time 222 indicating when an accelerator in a hibernate state is to be awoken in order to execute the task; and measured energy level of the task 224, which indicates how much energy (watt-hour) the task uses when profiled. In particular, instrumentation of the accelerator (e.g., using software, such as Active Energy Manager offered by IBM®) is used to measure the energy of the task when it is run during profiling. Initially, this value is zero for variable unknown execution time tasks and unknown constant execution time tasks. The wake-up trigger time is less than the start time to ensure the accelerator is ready when the task is to be executed. It is calculated by subtracting the time taken to wake up an accelerator from the start time of the task. In other embodiments, additional, less or different information may be included, such as measured power level of task (measured in watts by instrumentation on the server), as just one example. Other possibilities also exist.

Figure 3A:
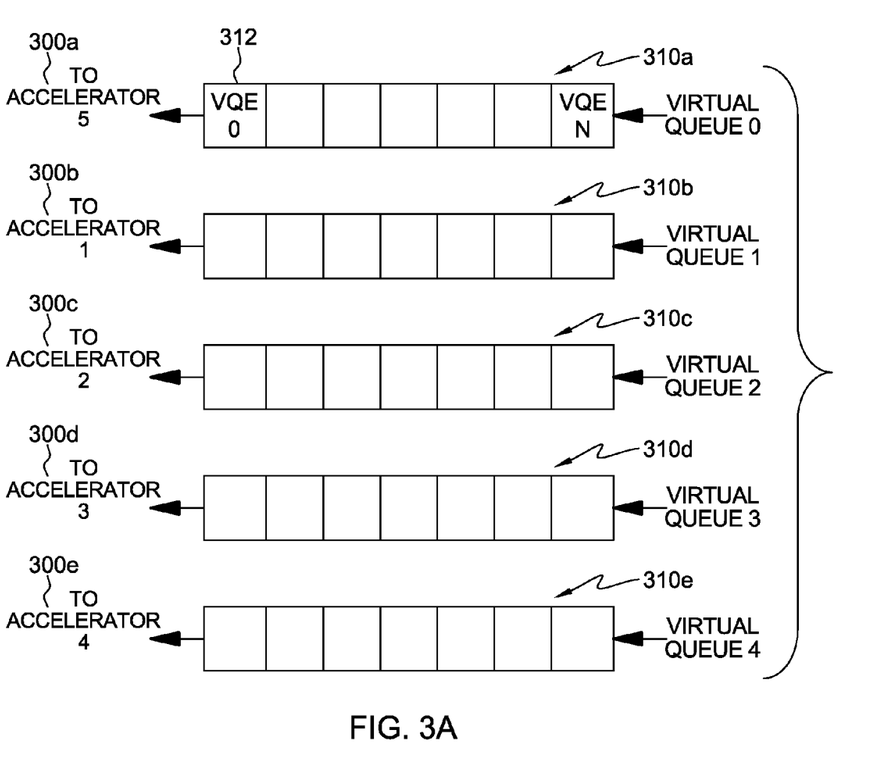
FIG. 3A depicts examples of virtual queues assigned to particular accelerators of an accelerator cluster, in accordance with an aspect of the present invention.

Although there is one physical queue per computing unit, in order to efficiently manage the accelerators, a plurality of virtual queues is used. Referring to FIG. 3A, each accelerator of the accelerator cluster (or a subset thereof) has a virtual queue assigned thereto. For instance, Accelerator 5 (300a) is assigned Virtual Queue 0 (310a); Accelerator 1 (300b) is assigned Virtual Queue 1 (310b); Accelerator 2 (300c) is assigned Virtual Queue 2 (310c); Accelerator 3 (300d) is assigned Virtual Queue 3 (310d); and Accelerator 4 (300e) is assigned Virtual Queue 4 (310e). Even though, in this example, five virtual queues are shown for five accelerators, in other examples, there may be more or fewer accelerators with a corresponding number of virtual queues.

Figure 3B:
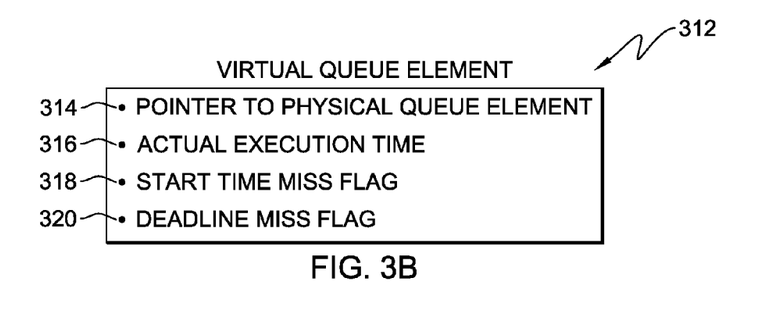
FIG. 3B depicts one example of a virtual queue element of a virtual queue of FIG. 3A, in accordance with an aspect of the present invention.

Each virtual queue includes a plurality of virtual queue elements 312. As described with reference to FIG. 3B, a virtual queue element 312 includes, for instance, a pointer to its corresponding physical queue element 314; an actual execution time field 316; a start time miss flag 318 indicating that the task is not scheduled to start on time; and a deadline miss flag 320 indicating that the task is not scheduled to complete on time.

Figure 4:
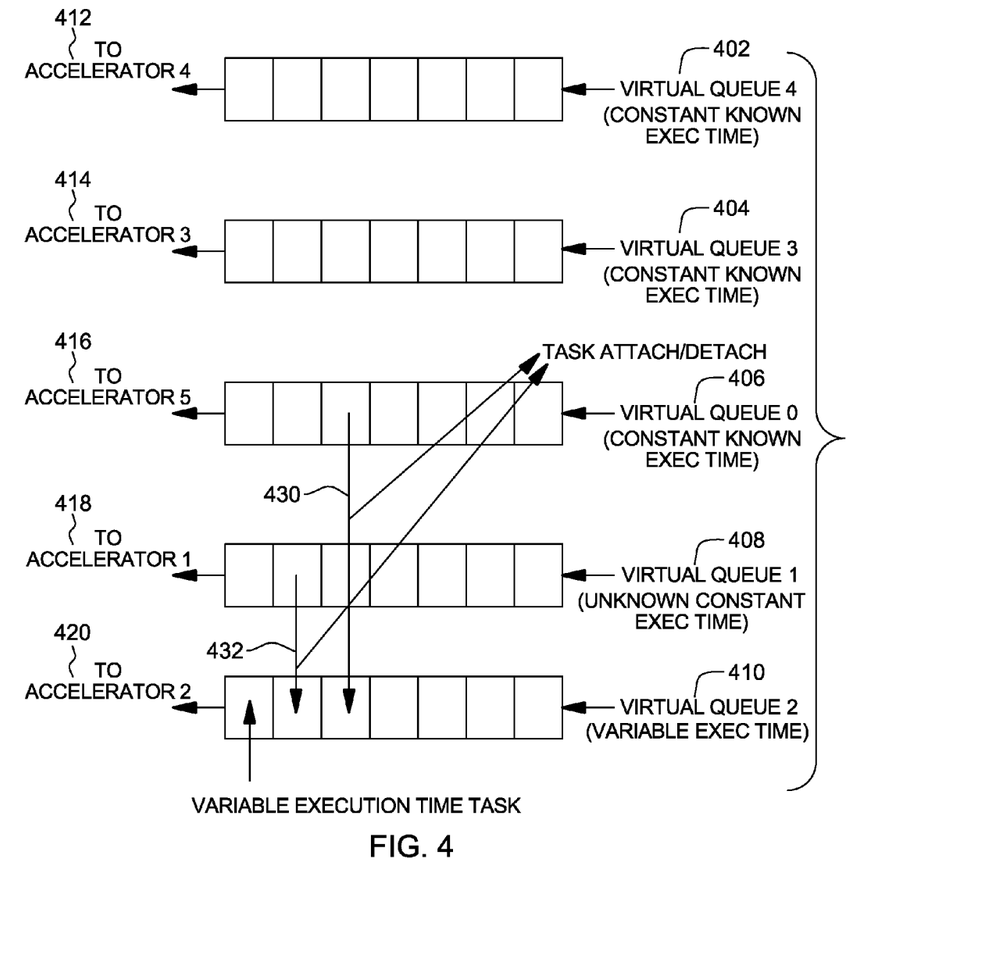
FIG. 4 depicts further details of various virtual queues assigned to specific accelerators of an accelerator cluster, in accordance with an aspect of the present invention.

In one embodiment, each virtual queue is associated with a particular class of tasks. For instance, as shown in FIG. 4, Virtual Queue 4 (402), Virtual Queue 3 (404) and Virtual Queue 0 (406) are associated with tasks having known constant execution times (KCET). That is, tasks to be queued on these virtual queues are those in which their execution times are known and constant. On the other hand, Virtual Queue 1 (408) includes those tasks that have a constant execution time, but that time is unknown (UCET). For these tasks, since the execution time is constant, it will become known after one of the tasks is executed. Additionally, Virtual Queue 2 (410) is used for those tasks that have variable unknown execution times (VUET). In this specific example, Virtual Queue 4 (402) is assigned to Accelerator 4 (412); Virtual Queue 3 (404) is assigned to Accelerator 3 (414); Virtual Queue 0 (406) is assigned to Accelerator 5 (416); Virtual Queue 1 (408) is assigned to Accelerator 1 (418); and Virtual Queue 2 (410) is assigned to Accelerator 2 (420).

Figure 3C:
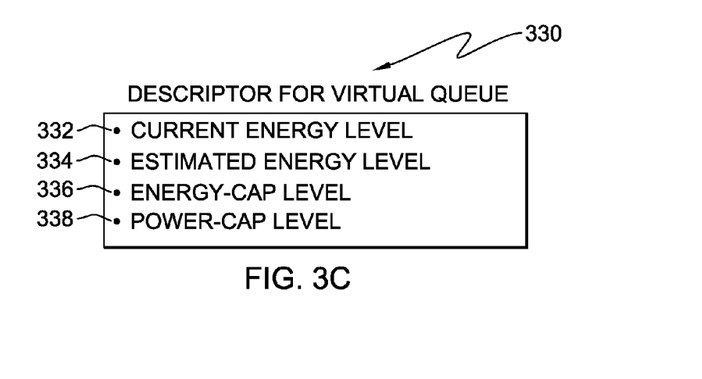
FIG. 3C depicts one example of a descriptor associated with a virtual queue, in accordance with an aspect of the present invention.

Associated with each virtual queue is a descriptor or register that is stored at the server, which includes various information regarding the accelerator assigned to the virtual queue. For instance, with reference to FIG. 3C, a descriptor 330 includes the current energy level for an accelerator 332; an estimated energy level of the accelerator 334; an energy-cap level for the accelerator 336; and a power-cap level for the accelerator 338. The current energy level 332 is the average energy consumption of the accelerator (e.g., measured in watt-hour). The energy consumption of the accelerator is measured at periodic intervals and then averaged to provide the average energy consumption. The estimated energy level 334 is the estimated energy level of the accelerator considering all the tasks in the virtual queue. This can be calculated using the start time and deadlines of each task in the queue. For example, start time and deadlines can be used to determine how many tasks will be running simultaneously until the deadline of the last task queued in the virtual queue. Other ways may also be possible. This information can be used to calculate the aggregate estimated energy using the measured energy levels of each task (see, e.g., FIG. 2). Energy-cap levels (i.e., maximum energy level) can be stored for each accelerator. If the estimated energy level of the accelerator equals the energy-capped level, then no further tasks are admitted into the virtual queue. Similar description holds for the power-cap level field (i.e., maximum power level). Energy-cap levels are also stored at the server for a group of accelerators, like a blade center, and termed the group energy-cap level. In this case, a task may not be issued from the single physical queue to the virtual queue, if the sum of estimated energy levels across all virtual queues equals the group energy-cap level, as an example. A similar example holds true for a group power-cap level.

In accordance with an aspect of the present invention, the accelerators are managed for efficient use and to promote energy conservation. Thus, each virtual queue is examined to determine if action should be taken with respect to that virtual queue and/or its corresponding accelerator. Specifically, the tasks of the entire depth of the queue are examined to determine if action for that queue and/or accelerator may be taken. Actions include, but are not limited to, moving tasks from one virtual queue to another virtual queue; and determining the start time for an accelerator, such that it is awake when needed for a task, but not sitting idle for too long.

Consider the following examples:

1. Assume Virtual Queue 4, which runs tasks with constant known execution times, has six tasks queued and each task has a completion time of 10 ms. The accelerator scheduler examines the completion time of all six tasks (not just the first task) and determines that all the tasks can be run on its corresponding accelerator and still finish on time. Thus, other accelerators are not brought up for these tasks (i.e., not run at all or remain in a hibernate state), and these tasks do not need to be moved for proper servicing.

2. Assume Virtual Queue 2, which runs tasks with variable unknown execution times, will be idle for a certain period of time before its next task is to be run. The tasks of other queues are examined to determine if one or more of those tasks may be moved from their virtual queue to Virtual Queue 2 without negatively impacting the tasks that are to run on Accelerator 2 (i.e., those tasks will finish by their completion time). In this particular example and with reference to FIG. 4, it is determined that a task 430 from Virtual Queue 0 and a task 432 from Virtual Queue 1 can be moved to Virtual Queue 2. Thus, task 430 is detached from Virtual Queue 0 and attached to Virtual Queue 2; and similarly, task 432 is detached from Virtual Queue 1 and attached to Virtual Queue 2. This allows Accelerator 2 to be more fully utilized and may allow Accelerator 1 or Accelerator 5 to remain in power-down mode, to be placed in power-down mode or to be placed in a hibernate state, if not needed for a certain period of time.

Many other examples and scenarios are also possible.

One embodiment of the logic used to efficiently manage accelerators in a computing environment to satisfy a particular goal, such as to conserve energy, is described with reference to FIGS. 5A-5E. In particular, one embodiment of the logic to schedule tasks on the virtual queues is described with reference to FIG. 5A; one embodiment of the logic to redistribute tasks to satisfy "miss flags" is described with reference to FIGS. 5B-5C; one embodiment of the logic to redistribute tasks based on policy is described with reference to FIG. 5D; and one embodiment of the logic to awaken a hibernating accelerator is described with reference to FIG. 5E.

Figure 5A:
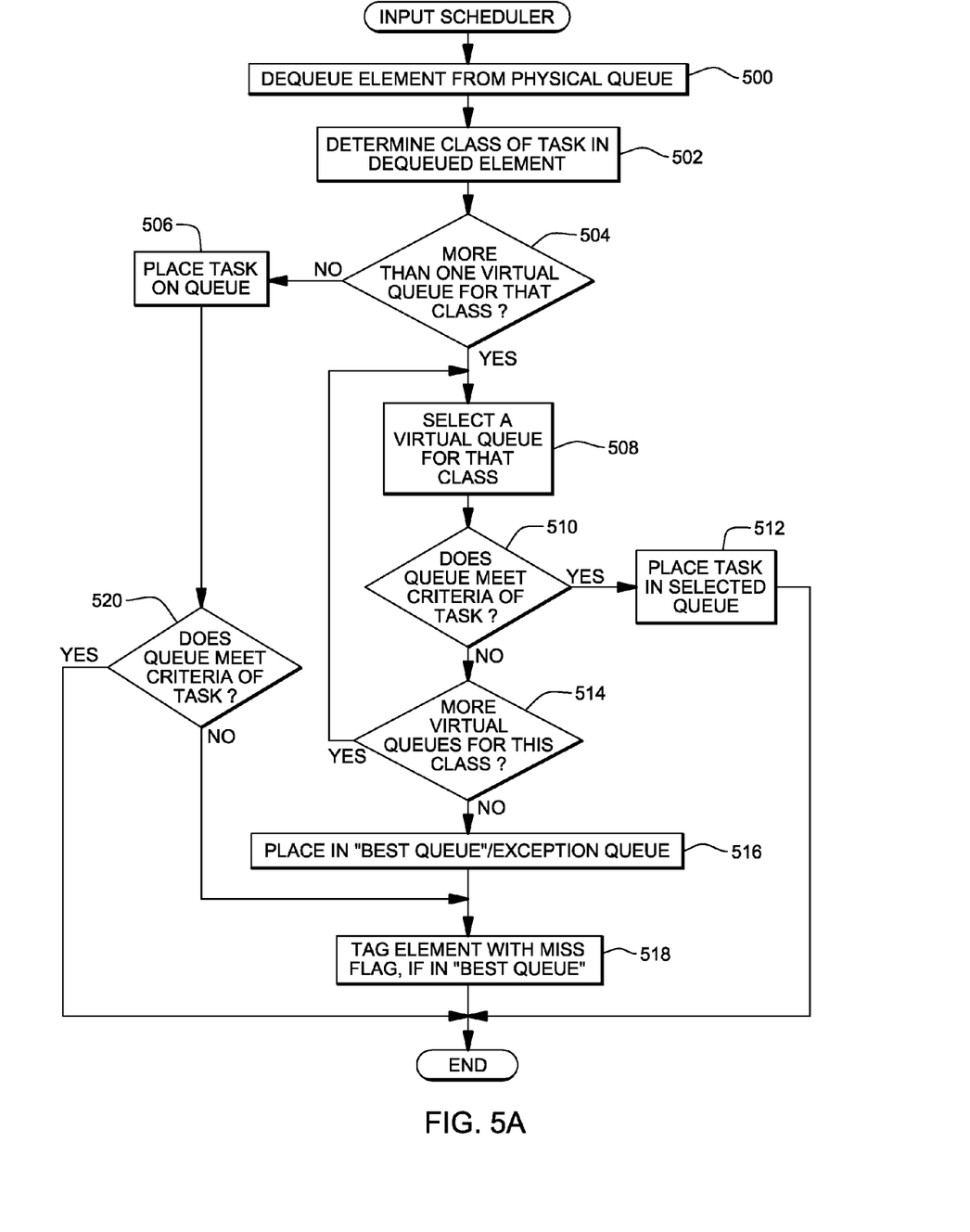
FIG. 5A depicts one embodiment of the logic to dequeue elements from the physical queue and enqueue them on virtual queues, in accordance with an aspect of the present invention.

Referring initially to FIG. 5A, a scheduler executing in the server performs this logic to assign tasks queued on the physical queue to appropriate virtual queues. This logic is performed, for instance, when there are queue elements on the physical queue to be processed and available space on one or more virtual queues that may potentially be assigned the tasks of those queue elements. It may also be run at other times, including when a task has a start time that is about to expire. Other examples are also possible.

Further, in this example, this logic is pre-dispatch of the tasks on the accelerators. This logic analyzes the queue beyond the first element to the other elements in the depth of the queue. It assigns as many tasks to virtual queues as possible, in one example.

With reference to FIG. 5A, initially, a queue element is dequeued from the physical queue, STEP 500. The queue element is examined to determine the class of task (e.g., KCET, UCET, VCET) stored within the queue element, as well as it start time and completion time, STEP 502. For instance, if a start time and completion time are provided, then it is a known constant execution time (KCET) task; if the completion time and the variable tag are zero, then it is an unknown constant execution time (UCET) task; and if the completion time is zero and the variable tag is one, then the task is a variable unknown execution time task (VUET).

Thereafter, a determination is made as to whether there is more than one virtual queue for that class of task, INQUIRY 504. If not, the task is enqueued on that one virtual queue, STEP 506, and processing continues with STEP 520, described below.

However, if there is more than one virtual queue for that class of task, then one of those virtual queues is selected, STEP 508. For instance, in one embodiment, the virtual queues are first sorted in increasing deadline order of the last element in the queues. As an example, the last element of each queue, which includes the latest deadline in this example, is copied to memory, and then, they are sorted in increasing deadline order to provide a list of virtual queues in increasing deadline order. This list is saved as the deadline order list. Similarly, a second list, called energy order list, is a sorted list of each queue's estimated energy level in increasing order. Then, based on policy, one of those queues is selected. For instance, if meeting the deadline is the first priority and energy level the second priority, then a queue with a deadline of the last task queued less than the start time for a task to be queued is chosen from the deadline order list. Then, if the energy level for the task added to the estimated energy level of that queue is less than the energy-capped level for the queue, then that queue is chosen. Other possibilities also exist.

A determination is then made as to whether the selected queue could meet the specified criteria of the task, such as, for instance, start time and completion time, and/or acceptable energy level, etc., INQUIRY 510. If so, then the task is enqueued on that queue, STEP 512, and processing is complete.

Otherwise, a further inquiry is made as to whether there are more virtual queues for this class of task, INQUIRY 514. If there are more queues, processing continues with STEP 508. For instance, another queue from the deadline order list is selected with the corresponding energy level check as aforementioned. Alternative prioritization policies are also possible. For instance, in the above description, the deadline order list was searched first and then the energy order list second. An accelerator energy policy might include that the energy list is searched before the deadline list. In addition, the priority order may be changed dynamically as the energy capacity of a system is approached (energy list priority over deadline list priority). Many other examples also exist.

Returning to INQUIRY 514, if there are no more virtual queues for this class, then the "best queue" is selected for the task, STEP 516. For instance, the queue that best meets the start, completion times and estimated energy levels, as directed by policy, is selected. If a "best queue" is found, the task is enqueued in a virtual queue element on that virtual queue, and the element is tagged with a "start time miss flag" or a "deadline miss flag" indicating the queue cannot satisfy the requirements of the task, STEP 518. However, it may be that no queue is found that can meet established criteria. In this case, the task is placed in an exception queue, which is adjunct to the single physical queue. Then, it can be tried every other element or simply placed at the end of the queue and serviced when its turn arrives in order. Processing is then complete.

Returning to STEP 506, after placing the task on the queue, a determination is made as to whether the queue can meet the criteria of the task, INQUIRY 520. If not, the queue element is tagged with the appropriate "miss flag", and processing is complete. However, if the queue can meet the criteria, then processing is complete. This processing repeats for other elements to be dequeued from the physical queue. If, for example, a queue is selected from the deadline order list for a given task in the physical queue, the next task from the physical queue will begin searching for eligible queues from the next virtual queue to allow load balancing of queues. Start-time ordered lists can also be considered as alternatives to deadline ordered lists. In this case, a next task is placed in a queue, if the distance between the start-time of the last element in a queue and the start-time of the next task is within a designer defined distance bound.

It is undesirable to have tasks that cannot be serviced as requested, and therefore, in accordance with an aspect of the present invention, an optimizer executing on the server performs redistribution at periodic intervals to attempt to address the "miss flags". One embodiment of this logic is described with reference to FIGS. 5B-5C. In this example, each element of each virtual queue is analyzed. This processing may be performed serially or in parallel, so that many queues may be analyzed concurrently.

Figure 5B:
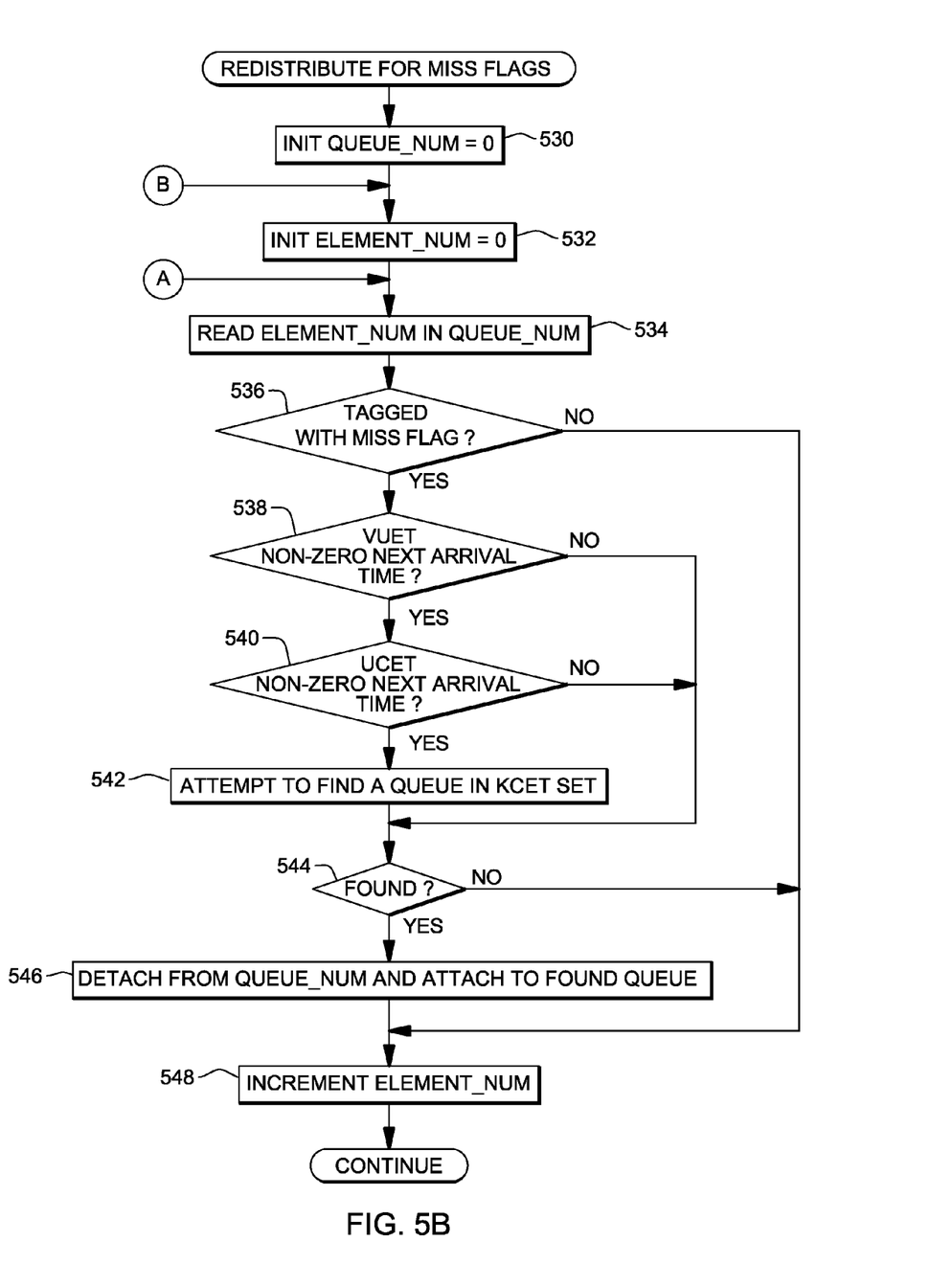
FIGS. 5B-5C depict one embodiment of the logic to redistribute tasks in response to being unable to satisfactorily service tasks, in accordance with an aspect of the present invention.

Referring to FIG. 5B, a variable referred to as queue_num is set equal to zero, STEP 530. Similarly, a variable referred to as element_num is set equal to zero, STEP 532. Thus, processing begins with the first element (element 0) in virtual queue 0. The element_num element in queue_num queue is then read, STEP 534. A determination is made as to whether the element has been tagged with a start time or deadline miss indicator (i.e., "miss flag"), INQUIRY 536. If it has been so tagged, then a further determination is made as to whether the one or more virtual queues established for variable unknown execution time tasks have been tagged with a non-zero next arrival time, INQUIRY 538. That is, are the one or more VUET virtual queues expecting tasks to arrive at its specified arrival time for execution?

If the one or more VUET virtual queues are tagged with non-zero next arrival times, then a determination is made as to whether the one or more unknown constant execution time (UCET) virtual queues are tagged with non-zero next arrival times, INQUIRY 540. If these special virtual queues (VUET and UCET) are so tagged, then an attempt is made to find a queue in the known constant execution time (KCET) set that can satisfy the start time and completion time criteria of the selected task, STEP 542. Thereafter, or if one or more of these special queues had a zero next arrival time, then an inquiry is made as to whether a queue has been found that can satisfy the start time and completion time criteria of the selected task, INQUIRY 544. If an adequate virtual queue is located, then the element_num queue element is detached from the queue_num queue and attached to the found queue, STEP 546.

Figure 5C:
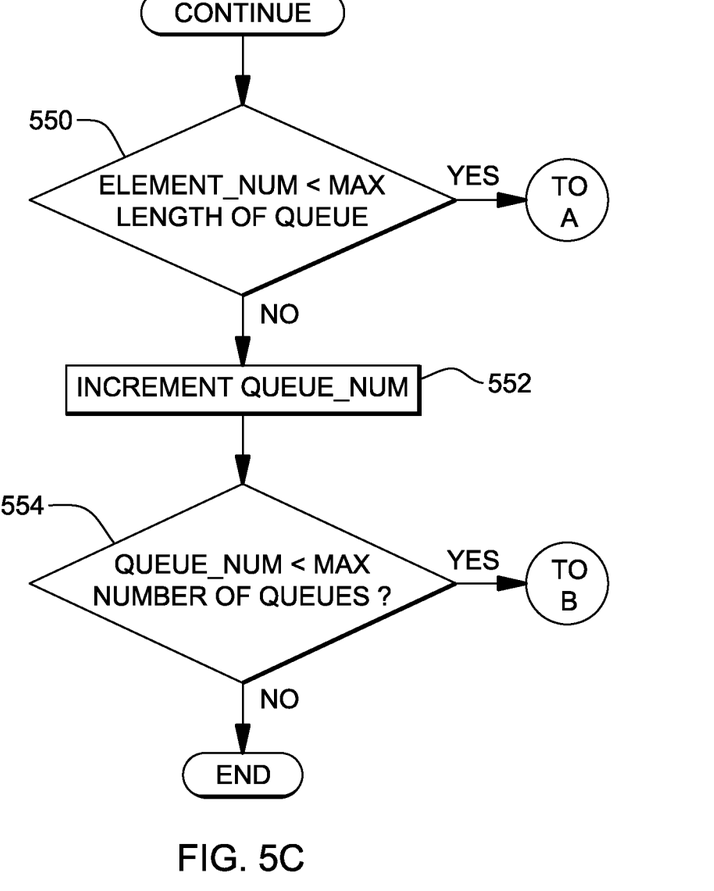

Subsequently, or if a queue is not found (INQUIRY 544) or if the queue is not tagged with the miss flag (INQUIRY 536), element_num is incremented, STEP 548. For example, element_num is incremented by 1. A determination is made as to whether element_num is less than the maximum length of the queue, INQUIRY 550 (FIG. 5C). If element_num is less than the maximum length of the queue, then processing continues with STEP 534 (FIG. 5B). Otherwise, the end of the queue has been reached, so queue_num is incremented (e.g., queue_num=queue_num+1), STEP 552 (FIG. 5C). Then, a determination is made as to whether queue_num is less than the maximum number of queues, INQUIRY 554. If queue_num is less than the maximum number of queues, there are more queues to be processed, and processing continues with STEP 532 (FIG. 5B). Otherwise, processing is complete.

As a further embodiment, in the task attach or detach techniques above, in one example, a task is not moved if its difference between start time and current time on a given accelerator virtual queue is increased when it is moved to another accelerator, in effect, "demoting" the task. A task attach or detach is to happen to "promote" a task if possible (i.e., closer to execution start time). If a queue has a non-zero next arrival time and all the current queue elements including the new task to be placed may be issued to the accelerator before the non-zero arrival time occurs, then it can still be moved to the virtual queue.

Although in the above example, a task is moved from one virtual queue to another virtual queue in response to an indication that the task will miss its start time or completion time, in a further example, a task may be moved even if its start time or completion time will not be missed, in order to provide optimal utilization of accelerators. One embodiment of the logic to redistribute a task based on, for instance, policy is described with reference to FIG. 5D.

In this example, an energy consumption policy is defined and stored, for instance, on the server. This policy is for the cluster of accelerators. It defines the maximum amount of power to be consumed by the cluster of accelerators, as an example. It may also define other consumption policies. For example, accelerators where estimated/current energy level is rapidly approaching accelerator or group capped energy levels (because of mis-estimated task energy data or variable/unknown execution time tasks running on the accelerator where task energy estimation is impossible) may become candidates for redistribution.

Figure 5D:
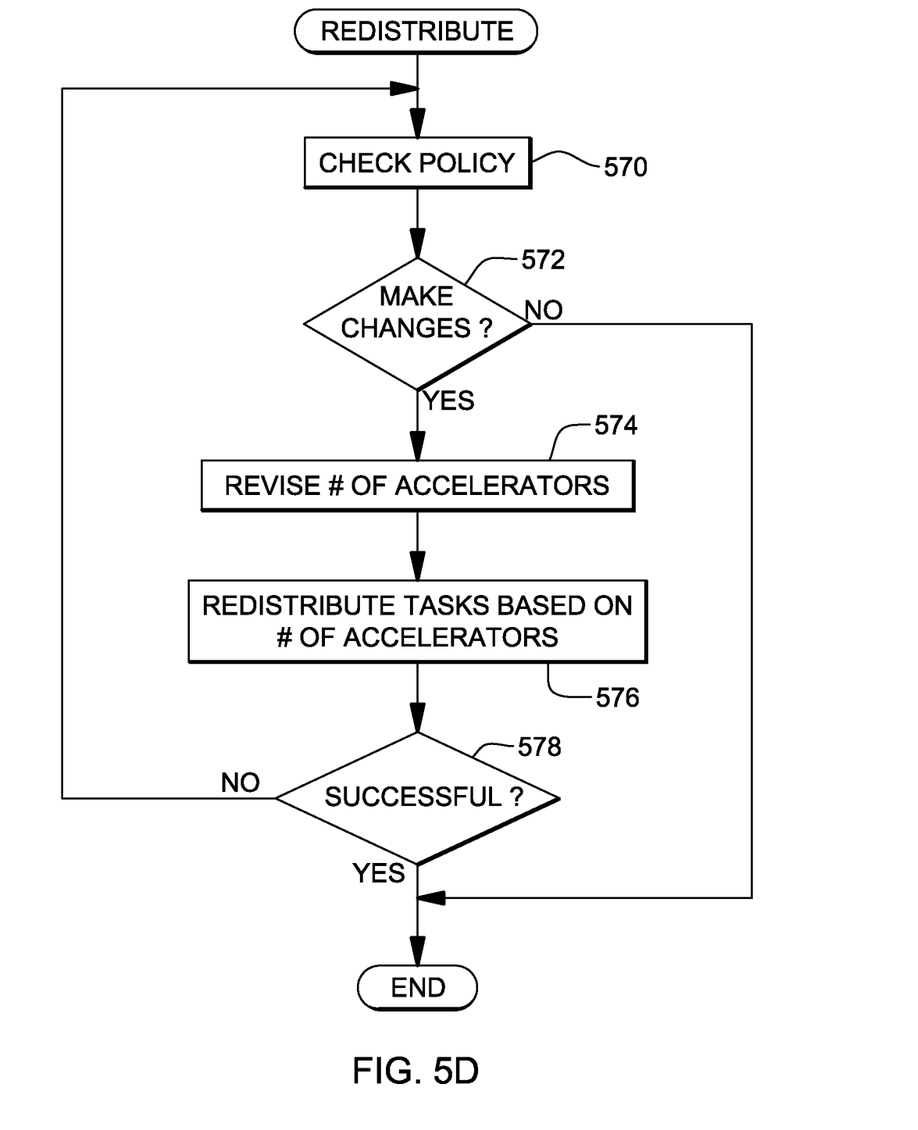
FIG. 5D depicts one embodiment of the logic to redistribute tasks based on policy, in accordance with an aspect of the present invention.

Referring to FIG. 5D, at predefined intervals, a check is made to determine if the policy is being adhered to, STEP 570. For instance, a determination is made as to whether more than the defined amount of power is being consumed by the cluster of accelerators or a single accelerator. If, in response to the policy check, a change is to be made, INQUIRY 572, then that change is attempted.

As an example, the number of accelerators powered-up is revised, STEP 574. In this particular example, since too much power is consumed, one or more accelerators are placed in a hibernate state or powered off completely. The tasks from those queues are then redistributed (e.g., detached from one queue and attached to another) based on the accelerators now available, STEP 576. The redistribution is to adhere to the classes of tasks. Also, the redistribution should not cause any "miss flags" in policy cases where task deadlines have priority over energy. This policy may change dynamically as estimated/current energy/power levels in an accelerator approach per accelerator energy/power cap levels. When this happens, in this example, energy goals being met are given priority over deadline goals.

Moreover, if the number of accelerators cannot be revised as in STEP 574, STEP 576 can still be run to move tasks from one virtual queue to another using estimated energy of each task to balance energy consumption of an accelerator. For example, if the estimated energy level of an accelerator is rapidly approaching energy cap level of an accelerator, then tasks may be redistributed in STEP 576 to ameliorate this situation. Similarly, if the current energy level of an accelerator is rapidly approaching the energy or power-cap of an accelerator because of mis-estimation of task energy, then redistribution can be used to improve this situation.

If the redistribution is successful in that the tasks have been redistributed to the correct classes and the policy criteria can be met, INQUIRY 578, then processing is complete. However, if the redistribution is unsuccessful for any reason (e.g., queue with needed class is unavailable, start time or completion time cannot be met, energy criteria cannot be satisfied), then the policy is checked to determine how to proceed, STEP 570. The policy will indicate whether the deficiencies are acceptable or whether further changes need to be made, including, but not limited to, reinstating the accelerators or placing tasks back in the exception queue adjunct to the single physical queue to meet energy and deadline goals.

Although in the above example, the policy indicates too much energy is being consumed, in other examples, the policy may indicate other scenarios—e.g., more accelerators needed, etc.

As described above, an accelerator may be in a hibernate state (e.g., standby, hibernate); however, if a queued task is to be serviced by the accelerator, then the accelerator is to be awoken just prior to the task needing the accelerator. Since completion times are stored within each virtual queue entry, accelerators in hibernate states can be awoken just in time to meet start time and deadlines of a task waiting for service. In one example, a wake-up trigger time entry is calculated and stored in the physical queue entry for the task, along with a task start time. The wake-up trigger time entry is calculated by an accelerator scheduler that executes on the server.

Figure 5E:
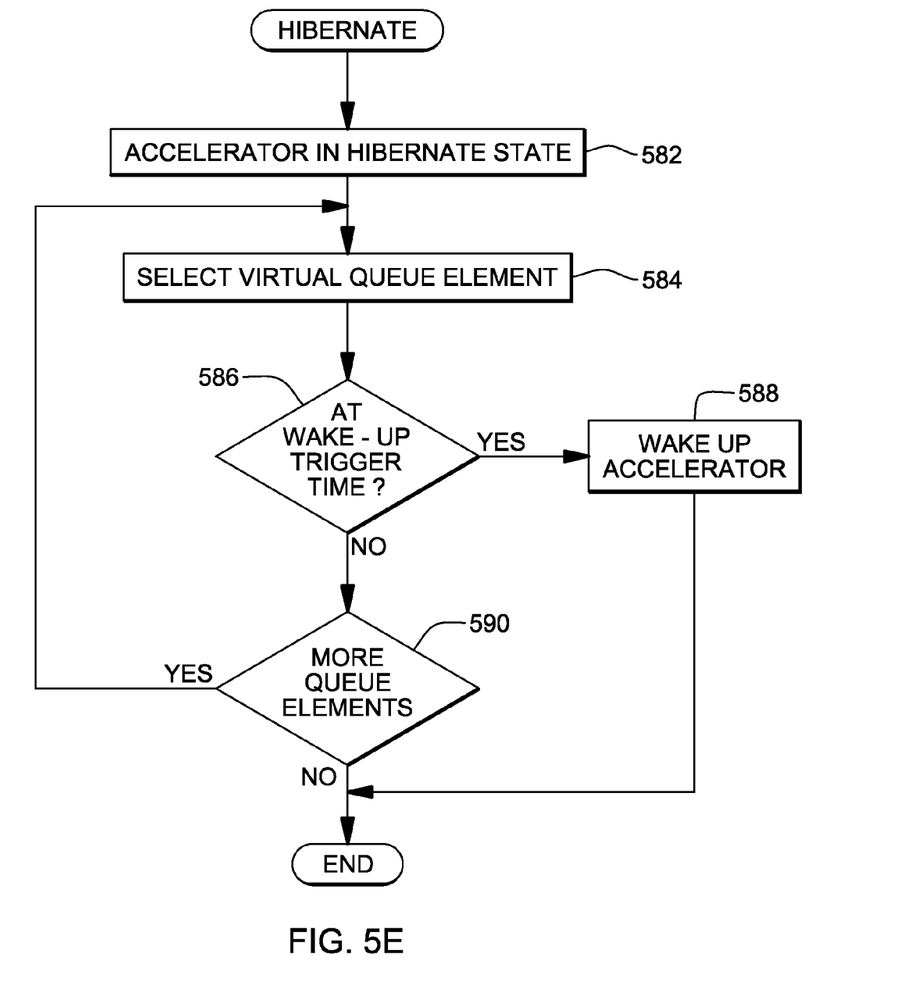
FIG. 5E depicts one embodiment of the logic to awaken an accelerator in a hibernate state, in accordance with an aspect of the present invention.

Referring to FIG. 5E, one embodiment of the logic to awaken a hibernating accelerator is described. In one example, the optimizer is executing this logic. Initially, an accelerator is in a hibernate state, STEP 582. A virtual queue element of the virtual queue associated with the accelerator is selected, STEP 584. A determination is made as to whether the wake-up trigger time for the task of this queue element has expired, INQUIRY 586. If so, the accelerator is awoken, STEP 588, and processing is complete.

However, if the wake-up trigger time for this task has not been met, then the other queue elements are checked to see if others have been met. Thus, an inquiry is made as to whether there are more queue elements to be checked, INQUIRY 590. If so, processing continues with STEP 584. Otherwise, processing is complete.

In a further aspect of the invention, an accelerator placed in hibernate mode may be awoken based on the energy consumption policy. For instance, if the average energy consumption is lower than a defined amount, the policy may indicate that one or more additional accelerators are to be powered-up (e.g., to accomplish additional work). In this situation, a queue is instantiated, associated with the accelerator, and tasks are redistributed to this queue.

In yet a further aspect of the present invention, since the virtual accelerator queue provides to the accelerator start and execution times for the tasks queued on the virtual queue, the accelerator can then use this information to reduce frequency and/or voltage to execute with optimal energy within the deadlines. That is, if the accelerator realizes that it can meet a deadline by using less energy, then it will slow down using hardware to save energy. This can be based on the overall energy policy communicated from the server to the accelerator. If the overall energy consumption is reaching capacity, then accelerators can be asked to run with reduced energy to meet deadlines.

Described in detail above is a capability for performing deep queue inspection of both the physical queue and virtual queues to enable the right number of accelerators to be run, instead of using the brut force technique of waking up all accelerators.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
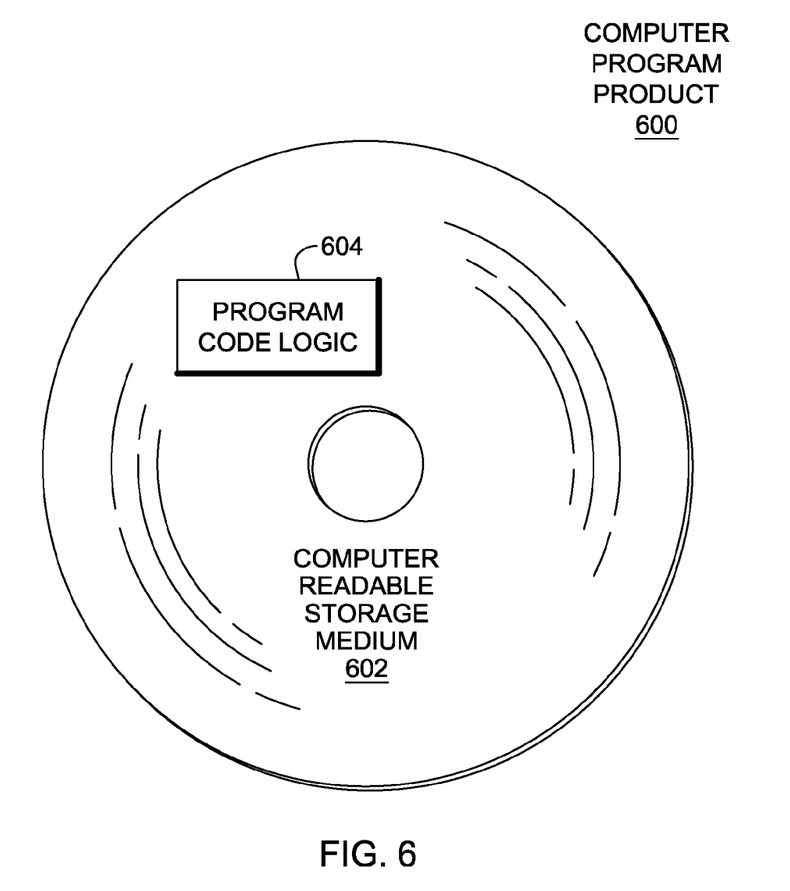
FIG. 6 depicts one embodiment of a computer program product incorporating one or more aspects of the present invention.

Referring now to FIG. 6, in one example, a computer program product 600 includes, for instance, one or more computer readable storage media 602 to store computer readable program code means or logic 604 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, other criteria may be used for redistribution, and/or the energy policy may include additional, less or different policies. Moreover, more or fewer accelerators and corresponding queues may be managed without departing from the spirit of the present invention. Many other revisions are also possible.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for managing accelerators of a computing environment, the computer program product comprising:
a storage medium readable by a processing circuit and storing instructions for execution by the processing circuit for performing a method comprising:
analyzing a plurality of tasks on an initial queue to obtain overall requirements for one or more accelerators of a set of accelerators; and
assigning the plurality of tasks to the one or more accelerators based on the analyzing, wherein the assigning the plurality of tasks to the one or more accelerators comprises assigning the plurality of tasks to one or more queues corresponding to the one or more accelerators, wherein a queue of the one or more queues is assigned a particular class of tasks, the particular class of tasks being based, at least in part, on knowledge about execution time of the tasks of that class, and wherein the assigning facilitates managing energy consumption of the set of accelerators.

2. The computer program product of claim 1, wherein the analyzing for a task of the plurality of tasks comprises determining at least one of a start time for the task, a completion time for the task or an energy level of the task, and assigning the task to an accelerator of the one or more accelerators based on at least one of the start time, the completion time or the energy level.

3. The computer program product of claim 1, wherein a task of the plurality of tasks to be assigned has a class associated therewith, and wherein the task is assigned to a queue of the one or more queues based on the class associated with the task matching the particular class assigned to the queue.

4. The computer program product of claim 3, wherein the class of the task is one of a constant known execution time class, a constant unknown execution time class, or a variable unknown execution time class.

5. The computer program product of claim 1, wherein the one or more queues comprises one or more virtual queues, and wherein a task scheduled to run on an accelerator is selected from the virtual queue corresponding to the accelerator.

6. The computer program product of claim 5, wherein the assigning of a task to a virtual queue of the one or more virtual queues comprises:
determining a class of the task; and
enqueuing the task on a virtual queue of the one or more virtual queues associated with that class.

7. The computer program product of claim 1, wherein the method further comprises redistributing an assigned task from one accelerator of the one or more accelerators to another accelerator on the one or more accelerators.

8. The computer program product of claim 7, wherein the redistributing is in response to an energy consumption policy associated with the set of accelerators.

9. The computer program product of claim 1, wherein the method further comprises providing to an accelerator of the one or more accelerators at least one of a start time and an execution time of a task assigned to the accelerator, wherein said at least one of start time and execution time are usable in adjusting one of frequency or voltage of the accelerator to optimize energy consumption of the accelerator.

10. The computer program product of claim 1, wherein an accelerator of the one or more accelerators is in a hibernate state, and said method further comprises awaking the accelerator prior to execution of the task assigned to the accelerator based on a wake-up trigger calculated using at least one of a start time or a completion time for the task.

11. The computer program product of claim 1, wherein the one or more accelerators to which tasks are assigned are powered up and other accelerators of the set of accelerators are not powered up.

12. A computer system for managing accelerators of a computing environment, the computer system comprising:
a memory; and
a processor in communications with the memory, wherein the computer system is capable of performing a method, said method comprising:
analyzing a plurality of tasks on an initial queue to obtain overall requirements for one or more accelerators of a set of accelerators; and
assigning the plurality of tasks to the one or more accelerators based on the analyzing, wherein the assigning the plurality of tasks to the one or more accelerators comprises assigning the plurality of tasks to one or more queues corresponding to the one or more accelerators, wherein a queue of the one or more queues is assigned a particular class of tasks, the particular class of tasks being based, at least in part, on knowledge about execution time of the tasks of that class, and wherein the assigning facilitates managing energy consumption of the set of accelerators.

13. The computer system of claim 12, wherein the one or more queues comprises one or more virtual queues, and wherein a task scheduled to run on an accelerator is selected from the virtual queue corresponding to the accelerator.

14. The computer system of claim 13, wherein the assigning of a task to a virtual queue of the one or more virtual queues comprises:
   determining a class of the task; and
   enqueuing the task on a virtual queue of the one or more virtual queues associated with that class.

15. The computer system of claim 12, wherein the method further comprises redistributing an assigned task from one accelerator of the one or more accelerators to another accelerator on the one or more accelerators, and wherein the redistributing is in response to an energy consumption policy associated with the set of accelerators.

16. The computer system of claim 12, wherein the method further comprises providing to an accelerator of the one or more accelerators at least one of a start time and an execution time of a task assigned to the accelerator, wherein said at least one of start time and execution time are usable in adjusting one of frequency or voltage of the accelerator to optimize energy consumption of the accelerator.

17. The computer system of claim 12, wherein an accelerator of the one or more accelerators is in a hibernate state, and said method further comprises awaking the accelerator prior to execution of the task assigned to the accelerator based on a wake-up trigger calculated using at least one of a start time or a completion time for the task.

18. A method of managing accelerators of a computing environment, said method comprising:
   analyzing a plurality of tasks on an initial queue to obtain overall requirements for one or more accelerators of a set of accelerators; and
   assigning, by a processor, the plurality of tasks to the one or more accelerators based on the analyzing, wherein assigning the plurality of tasks to the one or more accelerators comprises assigning the plurality of tasks to one or more queues corresponding to the one or more accelerators, wherein a queue of the one or more queues is assigned a particular class of tasks, the particular class of tasks being based, at least in part, on knowledge about execution time of the tasks of that class, and wherein the assigning facilitates managing energy consumption of the set of accelerators.

19. The method of claim 18, wherein the tone or more queues comprises one or more virtual queues, and wherein a task scheduled to run on an accelerator is selected from the virtual queue corresponding to the accelerator.

20. The method of claim 19, wherein the assigning of a task to a virtual queue of the one or more virtual queues comprises:
   determining a class of the task; and
   enqueuing the task on a virtual queue of the one or more virtual queues associated with that class.

* * * * *